US011634169B2

(12) United States Patent
Ognibene

(10) Patent No.: US 11,634,169 B2
(45) Date of Patent: Apr. 25, 2023

(54) ELECTRIC POWER STEERING DEVICE

(71) Applicant: OGNIBENE POWER S.P.A., Reggio Emilia (IT)

(72) Inventor: Claudio Ognibene, Reggio Emilia (IT)

(73) Assignee: OGNIBENE POWER S.P.A., Reggio Emilia (IT)

(*) Notice: Subject to any disclaimer, the term of this patent is extended or adjusted under 35 U.S.C. 154(b) by 352 days.

(21) Appl. No.: 16/761,918

(22) PCT Filed: Oct. 4, 2018

(86) PCT No.: PCT/IB2018/057714
§ 371 (c)(1),
(2) Date: May 6, 2020

(87) PCT Pub. No.: WO2019/092518
PCT Pub. Date: May 16, 2019

(65) Prior Publication Data
US 2020/0324804 A1    Oct. 15, 2020

(30) Foreign Application Priority Data
Nov. 7, 2017    (IT) .................... 102017000126691

(51) Int. Cl.
*B62D 5/04*    (2006.01)
*B62D 1/187*    (2006.01)
*B62D 5/097*    (2006.01)

(52) U.S. Cl.
CPC .......... *B62D 5/0415* (2013.01); *B62D 1/187* (2013.01); *B62D 5/0403* (2013.01);
(Continued)

(58) Field of Classification Search
CPC .... B62D 5/0415; B62D 1/187; B62D 5/0403; B62D 5/0463; B62D 5/097; F16C 2326/24
See application file for complete search history.

(56) References Cited

U.S. PATENT DOCUMENTS 5,887,671 A * 3/1999 Yuki .................... B62D 5/0463
180/68.1
6,876,349 B2 * 4/2005 Edwards .............. G09G 3/3688
345/98

(Continued)

FOREIGN PATENT DOCUMENTS

EP    2896547 A1    7/2015
JP    H07 315233 A    12/1995
(Continued)

*Primary Examiner* — Darlene P Condra
(74) *Attorney, Agent, or Firm* — Volpe Koenig

(57) ABSTRACT

An electric power steering device includes: —a steering column provided with: a base; an upper segment connected in a tiltable manner to the base, a steering axis comprising a lower axis rotatably contained inside the base; —a hydrostatic steering assembly; —an electrically assisted steering apparatus axially interposed between the steering column and the hydrostatic steering assembly and provided with: a support frame comprising a tubular central body; a shaft whose upper end axially projects outside an upper end of the central body and is connected to the lower end of the lower axis and whose lower end is connected to the hydrostatic steering assembly; and an electric motor positioned inside the central body of the support frame; in which the upper end of the central body is directly fixed to the base and in contact therewith.

10 Claims, 5 Drawing Sheets

(52) U.S. Cl.
CPC ............ *B62D 5/0463* (2013.01); *B62D 5/097* (2013.01); *F16C 2326/24* (2013.01)

(56) References Cited

U.S. PATENT DOCUMENTS

| | | | | |
|---|---|---|---|---|
| 2002/0157894 | A1* | 10/2002 | Hjelsand | B62D 6/008 180/446 |
| 2008/0272582 | A1* | 11/2008 | Higashi | B62D 1/195 280/777 |
| 2015/0203150 | A1* | 7/2015 | Ognibene | B62D 5/005 180/403 |
| 2018/0319421 | A1* | 11/2018 | Casini | B62D 1/184 |
| 2021/0001930 | A1* | 1/2021 | Ognibene | B62D 49/0692 |

FOREIGN PATENT DOCUMENTS

| | | | |
|---|---|---|---|
| WO | 2006045707 | A1 | 5/2006 |
| WO | 2017077472 | A1 | 5/2017 |

\* cited by examiner

ELECTRIC POWER STEERING DEVICE

TECHNICAL FIELD

The present invention relates to an electric power steering device for vehicles.

More in particular, the invention relates to an electric power steering device for vehicles, in particular for heavy vehicles such as tractors or earth moving machines.

PRIOR ART

As is well known, in a hydrostatic steering system (hydro steer) the wheels of the vehicles are steered by means of a hydraulic actuator, for example a double-acting hydraulic cylinder, which is connected with a hydraulic fluid reservoir through a pump and a hydraulic steering unit.

As long as the hydrostatic steering system works in a proper manner, i.e. with the pump functioning, the torque required at the steering wheel is very low, because the energy necessary for steering is provided by the pressurized fluid.

If the pressurized fluid is no longer available, for example because of a malfunction of the pump or for any other reason, the dispenser of the steering unit functions as a manual pump which still allows the steering of the vehicle, but obviously requiring a higher torque to be applied to the steering wheel.

To control the torque that has to be applied to the steering wheel in these and/or other conditions, a known solution is to associate to the hydrostatic steering system (provided with power steering) also an electrically assisted steering apparatus (called Electronic Power System, EPS).

Hence, there is a need to make as compact as possible, especially in the longitudinal direction, the electric power steering device formed by the steering column, the power steering and the EPS, allowing, at the same time, to provide the installer with a product that is already assembled and ready for installation on the vehicle.

A purpose of the present invention is to meet these needs of the prior art, within a solution that is simple, rational and has low cost.

These purposes are achieved by the features of the invention set forth in the independent claim. The dependent claims outline preferred and/or particularly advantageous aspects of the invention.

DESCRIPTION OF THE INVENTION

The invention, in particular, makes available an electric power steering device comprising:
a steering column provided with:
a base;
an upper segment connected to the base, in which the upper segment is connected in a tiltable manner with respect to the base;
a steering axis (articulated) comprising, for example, an upper axis, rotatably contained inside the upper segment and provided with an upper end adapted to be connected to a steering wheel, and a lower axis, rotatably contained inside the base and for example provided with an upper end connected (indirectly) to the upper axis and an opposite lower end;
a hydrostatic steering assembly (more in particular, hydro steering);
an electrically assisted steering apparatus (also referred to as EPS) axially interposed between the steering column and the hydrostatic steering assembly and provided with:
a support frame comprising a tubular central body;
a shaft whose upper end axially projects outside an upper end of the central body and is connected to the lower end of the lower axis and whose lower end is connected to the hydrostatic steering assembly; and
an electric motor comprising an annular rotor constrained in rotation to the shaft and an annular stator that coaxially surrounds the annular rotor and is fixed inside the central body of the support frame;
in which the upper end of the central body of the electric steering apparatus is directly fixed to the base of the steering column and in contact therewith.

Thanks to this solution, the electric power steering device appears particularly compact in longitudinal direction and particularly versatile for use in different vehicle models.

Advantageously, the shaft can be rotatably coupled to the support frame through a first bearing directly interposed between the shaft and a first cylindrical seat obtained in the base of the steering column.

In this way, the base of the steering column constitutes the upper lid of the support frame.

According to an additional aspect of the invention, the lower end of the lower axis can be contained axially inside the base, the upper end of the shaft protruding axially inside the base of the steering column.

Thanks to this solution, the connection of the steering axis to the shaft of the electrically assisted steering apparatus seems particular convenient and easy to achieve.

Advantageously, the lower end of the lower axis can be constrained in rotation to the upper end of the shaft by means of a joint with grooved profile, in which the lower end of the lower axis is of the female type and the upper end of the shaft is of the male type.

The base can also comprise a second cylindrical seat with orthogonal axis with respect to the lower axis, adapted to support a hinge pin for the tilting of the upper segment with respect to the base.

Through this solution, the base can define the foot of an articulation that makes the steering column tiltable for the orientation of the steering wheel connected thereto.

Preferably, between the base and the upper segment of the steering column is interposed an intermediate segment, the upper segment being slidably connected to the intermediate segment.

Thanks to this solution, the steering column and hence the steering wheel connected thereto is adjustable in height.

The steering column can also comprise an actuating lever connected to the upper segment, which can be operated to unlock and/or lock the mutual inclination between the base and the upper segment.

Advantageously, the hydrostatic steering assembly, or the hydro steering, can comprise a distributor and a dispenser and/or an outer body fixed to a lower end of the central body of the support frame, for example by the interposition of a (lower) lid.

According to another aspect of the invention the shaft can comprise a input portion whose upper end axially projects outside an upper end of the central body and is connected to a lower end of the lower axis and an output portion whose lower end is connected to the hydrostatic steering assembly and the electrically assisted steering comprises a torsion bar having a first end constrained in rotation to the input portion of the shaft and a second end constrained in rotation to the output portion of the shaft.

Thanks to this solutions, the control of the electric power steering device is more precise.

One aspect of the invention, independently protectable, makes available an electrically assisted steering apparatus (also referred to as EPS) able to be axially interposed between a steering column and a hydrostatic steering assembly (more in particular the hydro steering), which is provided with:
- a support frame comprising a tubular central body (open superiorly);
- of which a shaft whose upper end axially projects outside an upper end of the central body (and is adapted to be connected to the lower end of a lower axis of the steering column) and whose lower end axially projects outside a lower end (opposite to the upper end) of the central body (and is adapted to be connected to the hydrostatic steering assembly), and
- an electric motor comprising an annular rotor constrained in rotation to the shaft and an annular stator that coaxially surrounds the annular rotor and is fixed inside the central body of the support frame;

in which the (open) upper end of the central body of the support frame is (closed by and) directly fastened to a base of the steering column and in contact therewith, which base for example comprises at least one cylindrical seat for the definition of an articulated joint (for the tilting) of the steering column.

BRIEF DESCRIPTION OF THE DRAWINGS

Further features and advantages of the invention shall become readily apparent from reading the following description provided by way of non-limiting indication, with the aid of the figures illustrated in the accompanying drawings.

BEST EMBODIMENT OF THE INVENTION

Figure 1:
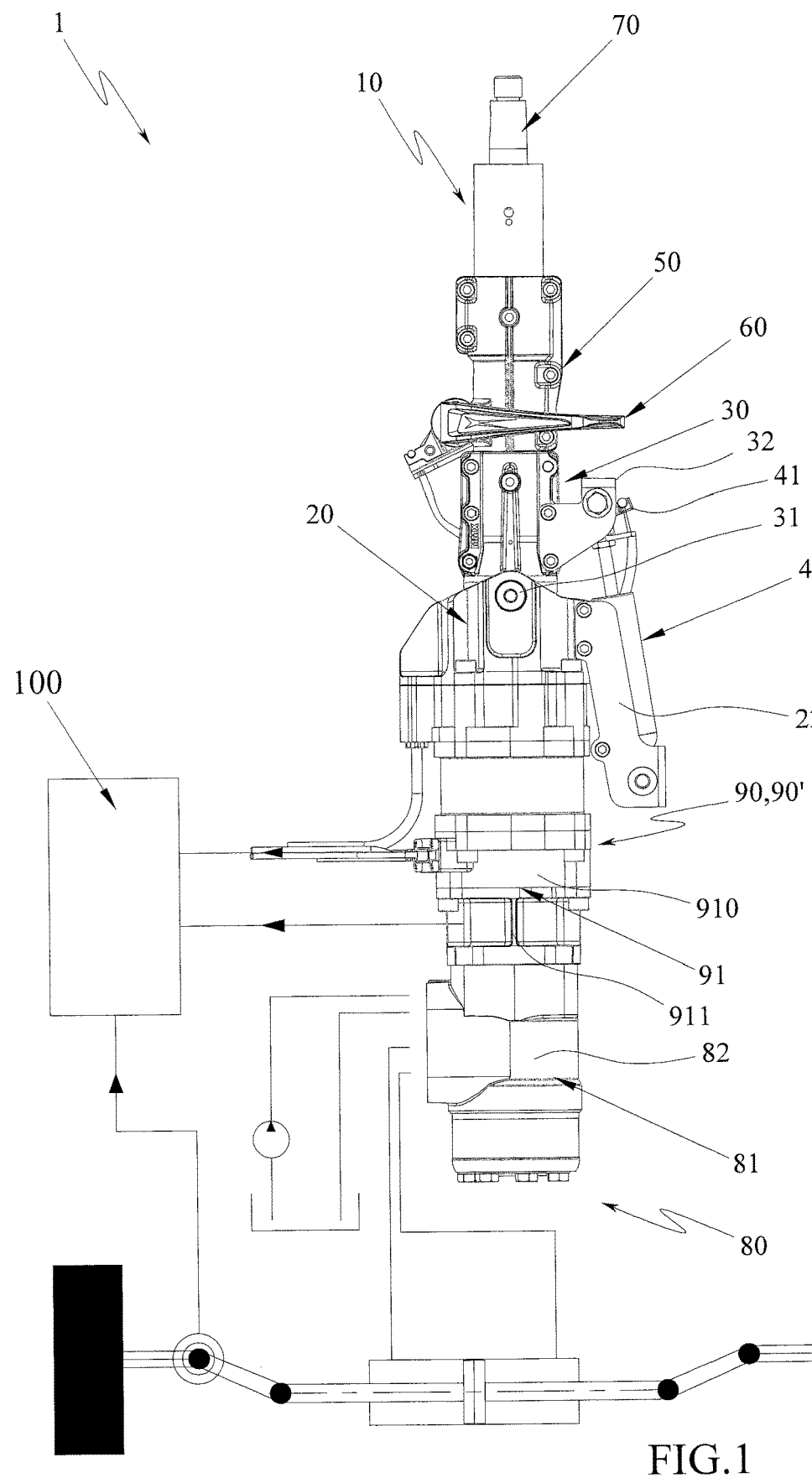
FIG. 1 is a lateral view of an electric power steering device according to the invention.

With particular reference to the figures, the numeral 1 globally indicates an electric power steering device for vehicles, for example heavy vehicles such as farm vehicles, in particular for heavy vehicles able to move at slow speed (typically below 60 km/h), for example farm tractors or earth moving machines.

The device 1 comprises a steering column 10.

The steering column 10 comprises a base 20.

Preferably, the base 20 is a monolithic body obtained by die-casting (of aluminium).

The base 20 has a lower end, for example substantially flat, preferably defined by a holed flange.

The base 20 could have different heights according to needs.

The base 20, for example, is substantially hollow internally and comprises a full development cavity 21, for example of the tubular type, with substantially vertical axis.

The cavity 21 defines, at its lower extremal segment, a first cylindrical seat 210 with substantially vertical axis, i.e. coaxial with the cavity 21.

The base 20 further comprises a second cylindrical seat 22 that is transverse (for example orthogonal) with respect to the axis of the cavity 21, i.e. for example with substantially horizontal axis.

For example, the second cylindrical seat 22 passes from side to side through the jacket of the base 20.

On the base 20 a first ear 23 is fixed, for example projecting in substantially radial direction outside the base, is also obtained in a perpendicular position with the second cylindrical seat 22.

The steering column 10 further comprises an intermediate segment 30, which is connected to the base 20 with respect to a single first rotational degree of freedom.

The intermediate segment 30 for example comprises a substantially cylindrical body, for example with variable section along the axis (from a widened lower end to a tapered upper end).

The intermediate segment 30 is for example substantially hollow and has a substantially cylindrical inner cavity.

In particular, the intermediate segment 30 is hinged, for example at its lower end, to the base 20 with respect to an axis of inclination A orthogonal to the axis of the cylindrical cavity 21.

In particular, the intermediate segment 30 supports a hinge pin 31, which is housed in the second cylindrical seat 22 of the base 20.

The hinge pin 31 allows the oscillation of the intermediate segment 30 with respect to the base 20 around the axis of inclination A.

In practice, the intermediate segment 30 is adapted to be oscillated with respect to the base 20 alternatively between an alignment configuration, in which the axis of the cavity 21 of the base 20 coincides with the central axis of the intermediate segment 30, and a non-alignment configuration, in which the axis of the cavity 21 of the base 20 is inclined relative to the central axis of the intermediate segment 30, for example by an acute angle, for example between −20° and +40° (the angles inclined towards the driver being positive) with respect to the alignment configuration preferably between 0° and 30° or between −15° and +30°, or otherwise configurable according to needs.

The intermediate segment 30, for example, comprises a second ear 32, for example projecting in substantially radial direction outside the intermediate segment itself in a perpendicular position with the hinge pin 31 (housed in the second cylindrical seat 22).

The second ear 32 is substantially superposed to the first ear 23 along a plane that is orthogonal to the second cylindrical seat 22 and passing through the axis of the inner cavity 21.

The steering column 10 comprises an assembly for blocking the mutual rotation between the intermediate segment 30 and the base 20 with respect to the axis of inclination A.

In particular, between the intermediate segment 30 and the base 20 is interposed a gas spring 40, which is configured to exercise an elastic thrust between the intermediate segment 30 and the basement 20, for example directed towards their configuration of alignment.

The gas spring 40 comprises a cylinder hinged to the base 20, for example at the first ear 23.

In addition, the gas spring 40 comprises a stem that is slidably inserted in the cylinder and hinged to the intermediate segment 30, for example at the second ear 32.

The stem supports a piston (not visible in the figures) positioned inside the cylinder for pneumatic actuation, by a fluid, for example a (compressible) gas, of the stem from a retracted configuration to an extracted configuration from the cylinder.

The gas spring 40 comprises a control element 41, for example positioned at the stem, preferably at its distal end from the cylinder, which can be actuated selectively between a (raised) blocking position, in which it blocks the sliding of the stem in a determined axial position (interposed between the retracted configuration and the extracted configuration, included) with respect to the cylinder, and a (lowered) unblocking position, in which it frees the sliding of the stem with respect to the cylinder.

The control element 41 comprises for example a lever, for example a choke lever, rotatably coupled to the stem and able to be operated in rotation by a pre-set angle for the shift from the blocking position to the unblocking position.

The steering column 10 further comprises an upper segment 50, which is connected to the intermediate segment 30, for example in a slidable manner with respect to a sliding direction parallel to the axis of the intermediate segment 30 itself.

The upper segment 50 comprises for example a cylindrical body, for example also hollow (provided with a cylindrical inner cavity), which is coaxially connected to the intermediate segment 30.

The upper segment 50 and the intermediate segment 30 for example define a connection of the telescoping type, for example prismatic.

In practice, the upper segment 50 is connected to the intermediate segment 30 with respect to a single second translational degree of freedom, additional with respect to the rotational degree of freedom described above, of the upper segment 50 with respect to the base 20.

For example, the upper segment 50 and the intermediate segment 30 are inserted inside each other with radial play, for example the upper segment 50 is inserted on the intermediate segment 30.

The upper segment 50 comprises a releasable friction blocking assembly, which is configured to releasably block the mutual sliding between the upper segment 50 and the intermediate segment 30.

The lower end segment of the upper segment 50 comprises a clamping extremal portion 500, which is inserted on the upper end segment of the intermediate segment 30 and which can be selectively switched between an expanded configuration, in which it allows the mutual axial sliding between the upper segment 50 and the intermediate segment 30, and a contracted configuration, in which it prevents (by friction) said mutual axial sliding.

For example, the extremal clamping portion 500 is a substantially cylindrical body provided with an axial split 501 which allows the circumferential deformation of the cylindrical body if subjected to a compression.

In practice, the axial split 501 defines two sections of the cylindrical body that can move towards and away from each other deforming (respectively narrowing and widening) the minimum inner diameter of the extremal grip portion 500.

In the contracted configuration, the free ends of the cylindrical body (or of the sections) at the axial split are approached to each other, while in the widened configuration the free ends of the cylindrical body at the axial split are distant from each other, for example more distant than they are in the contracted configuration.

For example, the extremal clamping portion 500, i.e. the substantially cylindrical body, is so configured as to be normally, i.e. if not stressed, in the widened configuration.

In practice, the extremal clamping portion 500 has (elastic) return means, for example due to the elasticity of the material whereof it is made, which push the extremal grip portion 500 in the widened configuration.

On the extremal clamping portion 500, i.e. on each section of the cylindrical body thereof, is provided a pair of parallel and separate ears 502, each of which has a through hole 503, for example cylindrical, with through axis that are mutually concentric and substantially orthogonal to the axis of the cylindrical cavities of the intermediate segment 30 and of the upper segment 50 (i.e. parallel to the axis of inclination A).

The ears 502 are mutually movable towards and away from each other for the actuation of the extremal clamping portion 500, respectively, between the contracted configuration and the widened configuration.

The ears 502 are adapted to support, within the respective through hole 503, an actuation pin 52, whose longitudinal axis is orthogonal to the axis of the upper segment 50.

The actuation pin 52 is substantially cylindrical and its longitudinal axis coincides with the axis of the actuation pin itself.

The actuation pin 52 is inserted coaxially inside the through holes 503.

The actuation pin 52 is axially divided in an ideal manner so as to have two opposite end projecting from opposite sides with respect to the ears 502.

The steering column 10 comprises an actuation lever 60 connected to the upper segment 50 which can be operated between a blocking position, in which it constrains both the degrees of freedom of the upper segment 50 with respect to the base 20, in particular the translational degree of freedom between the upper segment 50 and the intermediate segment 30 and the rotational degree of freedom between the intermediate segment 30 and the base 20, and two distinct unblocking positions, in each of which it frees respectively one of the two degrees of freedom of the upper segment 50 with respect to the base 20 (i.e. respectively the translational degree of freedom between the upper segment 50 and the intermediate segment 30 and the rotational degree of freedom between the intermediate segment 30 and the base 20).

The actuation lever 60 is for example adapted to operate on the actuation pin 52, as will be better described below.

In particular, the actuation lever 60 is hinged to the actuation pin 52 with respect to a first axis of oscillation orthogonal to the longitudinal axis (of revolution) of the actuation pin 52 (orthogonal to the axis of translation of the upper segment 50 with respect to the intermediate segment 30).

For example the actuation lever 60 is hinged to the actuation pin 52 by means of the additional pin 57.

The actuation lever 60 comprises, at the end constrained to the actuation pin 52, a cam 61 provided with an eccentric profile with respect to the first axis of oscillation.

The cam 61, for example, has a widened area positioned at a determined angle, for example substantially perpendicular, with respect to the first axis of oscillation from a tapered area.

In practice, the widened region defines an eccentric area located on an arc centred on the first axis of oscillation having a greater distance from the first axis of oscillation of the eccentric area located on another arc centred on the first axis of oscillation defined by the tapered area.

The cam 61 is adapted to come in contact, selectively with its widened region or its tapered region, with one of the ears 502 bringing them respectively to the contracted configuration and to the widened configuration.

In practice, actuating the actuation lever 60 from the blocking position to the unblocking position (making it oscillate with respect to the first axis of oscillation by the predetermined angle) the extremal clamping portion 500 is brought from the closed position to the open position and, hence, the translational degree of freedom of the upper segment 50 with respect to the intermediate segment 30 is released.

The actuation pin 52 (and/or the actuation lever 60) comprises an eccentric portion 58 (eccentric with respect to the central longitudinal axis of the actuation pin 52 itself), which for example is defined by a lever spliced on the actuation pin 52 and projecting radially therefrom for example in a radial direction.

The eccentric portion 58 is for example fixed (axially and in rotation) to the second extremal portion of the actuation pin 52.

The eccentric portion 58 is for example superposed in plan (at a distance) to an edge of a support bracket fixed to the upper segment 50.

Both the eccentric portion 58 and the edge have for example a respective through hole, laterally opened, substantially aligned.

The actuation lever 60 is rotatably connected to the upper segment 50 with respect to a second axis of oscillation coinciding with the central longitudinal axis of the actuation pin 52, which can rotate inside the through holes 503.

An oscillation of the actuation lever 60 and, hence, of the eccentric portion 58 (integral in rotation therewith), with respect to the second axis of oscillation (in one direction of rotation or the other) is such as to selectively remove and approach the eccentric portion 58 from and to the edge.

The eccentric portion 58 is connected by means of a traction cable 59, for example a Bowden sheathed cable, to the control element 41 of the gas spring 40 for the actuation of the control element 41 selectively between its blocking position and its unblocking position, as a result of an oscillation of the eccentric portion 58 with respect to the second axis of oscillation C of a determined set angle of oscillation.

In particular, the sheath of the sheathed traction cable 59 is fixed at the opposite ends to the edge (at the laterally open through hole thereof) and a fixed bracket associated underneath the control element 41 of the gas spring 40 and the cable of the sheathed traction cable 59 is fixed at the opposite ends to the eccentric portion 58 (at the laterally open through hole thereof) and to the control element 41 of the gas spring 40.

The unblocking of the constraint preventing the inclination of the upper segment 50 with respect to the intermediate segment 30 around the axis of inclination A can be achieved as follows.

A rotation of the actuation lever 60 with respect to the second axis of oscillation between the blocking position and a second unblocking position, in which it is rotated by an angle (for example, acute), for example downwards, causes a mutual distancing between the eccentric portion 58 and the edge.

In particular, the cable of the sheathed traction cable 59 is tensioned and the control organ 41 of the gas spring 40 is brought from the blocking position to the unblocking position, unblocking the control body 41 of the gas spring 40 which will then allow the adjustment of the inclination, with respect to the axis of inclination A, of the intermediate segment 30 (and hence of the upper segment 50) with respect to the base 20, for example in contrast to the action of the gas spring 40.

The steering column 10 further comprises a steering axis 70, which is contained inside for examples inserted with play inside the respective inner cavities and supported in rotation with respect thereto by appropriate rolling bodies, for example bearings, for example radial (ball bearings).

In particular, the steering axis 70 comprises a lower axis 71, which is inserted (axially blocked) coaxially inside the inner cavity of the base 20 and is rotatable with respect to an axis of rotation coaxial thereto (blocked axially).

A lower end of the lower axis 71 is for example contained axially inside the base 20, i.e. it does not project inferiorly thereto, but is substantially at half the height of the base 20.

The lower end of the lower axis 71 defines a half-joint with grooved profile, i.e. it has a groove, specifically an internal groove (female).

The steering axis 70 also comprises a lower axis 72, which is inserted (axially blocked) coaxially inside the inner cavity of the intermediate segment 30 and is rotatable with respect to an axis of rotation coaxial thereto.

The intermediate axis 72 and the lower axis 71 are connected to each other by means of a joint 73, for example a universal joint, which allows the transfer of the rotary motion from the intermediate segment 72 to the lower axis 71 also as a result of an inclination of the intermediate segment 30 with respect to the base 20 around the axis of inclination A.

The steering axis 70 also comprises an upper axis 74, which is inserted (axially blocked) coaxially inside the inner cavity of the upper segment 50 and is rotatable with respect to an axis of rotation coaxial thereto.

The upper axis 74 is slidably connected, for example in a telescoping manner, to the intermediate axis 72, for example driven to slide by the sliding of the upper segment 50 with respect to the intermediate segment 30.

An upper end (for example projecting superiorly from the upper segment 50) of the upper axis 74 can be connected, for example rigidly, to a steering wheel for the actuation in rotation of the steering axis 70 with respect to the upper segment 50, to the intermediate segment 30 and to the base 20 to steer the vehicle.

The steering column 10 may be of a different type from the one described above, for example it could have two hinged articulated joints to be tiltable with respect thereto, as is well known to the person skilled in the art.

The device 1 also comprises a hydrostatic steering assembly 80.

The hydrostatic steering assembly 80 can comprise a double-acting hydraulic cylinder (represented only schematically in FIG. 1), which is provided with a piston that divides the internal volume of the cylinder in two separate chambers. The piston comprises two opposite stems, which project outside the cylinder and are mechanically connected to the lever mechanisms of the steering wheels of the vehicle. In this way, to each displacement of the piston in one direction or in the opposite direction corresponds a different steering angle of the wheels.

The hydrostatic steering assembly 80 further comprises a pump (also represented only schematically in FIG. 1), for example a positive displacement pump driven by the motor of the vehicle, which is able to draw oil from a reservoir and to send it under pressure to a hydro steering unit 81.

The steering unit 81 comprises an outer body 82, which is provided with a first port in direct hydraulic communication with the delivery of the pump, a second port in direct hydraulic communication with the reservoir, a fourth port in direct hydraulic communication with the first chamber of the hydraulic cylinder, and a fourth port in direct hydraulic communication with the second chamber of the hydraulic cylinder.

Inside the outer body 82, the steering unit 81 comprises a dispenser DISP and a rotary distributor DIST, which are both connected to the steering wheel through the steering column 10.

The dispenser DISP can comprise a sort of positive displacement gear pump, commonly called "gerotor", which comprises an inner gear that meshes with an outer sprocket, in which the gear is slightly off-axis with respect to the sprocket and is directly spliced to an input shaft 83 of the steering unit 81, which in turn is connected to the steering column 10, as will be better described below.

The rotary distributor DIST can comprise a rotating assembly, rotatably housed inside the outer body 82, which is provided with two cylinders coaxially inserted one in the other, of which an inner cylinder directly spliced to the input shaft 83 and an outer cylinder able to rotate with respect to the inner cylinder by a limited angle in both directions.

When the steering wheel is still, the outer cylinder of the distributor DIST is in a neutral position with respect to the inner cylinder so that all of the fluid that enters into the distributor body coming from the pump is sent directly back to the reservoir.

In the moment when the steering wheel is actuated in one of the two directions, the inner cylinder of the distributor effects a small rotation with respect to the outer cylinder and moves to a first operating position in which the first chamber of the double-acting cylinder is in connection with the reservoir, while the second chamber is in connection with the delivery of the pump through the dispenser.

In this way, continuing the rotate the steering wheel in the same direction, the dispenser transfers to the second chamber a quantity of pressurised fluid that is proportional to the rotation effected by the inner gear of the gerotor and hence by the steering wheel, thus actuating the piston of the double-acting cylinder in the sense of proportionately changing the steering angle of the wheels.

When the steering wheel is stopped, the outer cylinder of the distributor is returned to neutral position by means of spring systems, so as to stop the wheels in the configuration they reached.

Reversing the direction of rotation of the steering wheel, the operation of the steering unit 81 is the same, with the sole difference that the inner cylinder of the distributor is brought to a second operating position such as to connect the second chamber of the double acting cylinder with the reservoir and the first chamber with the delivery of the pump (also through the dispenser), allowing a displacement of the wheels in the opposite direction to the previous one.

The device 1 further comprises an electrically assisted steering apparatus 90, 90' axially interposed between the steering column 10 and hydrostatic steering assembly 80, i.e. the steering unit 81. In practice, the steering unit (81 (hydro steering) is connected with the steering column 10 through the electrically assisted steering apparatus 90, 90'.

The electrically assisted steering apparatus 90, 90' comprises a support frame 91, substantially shaped as a casing, which can be directly connected to the outer body 82 of the steering unit 81 and to the base 20 of the steering column 10, so as to realise a single compact assembly therewith.

In the illustrated example, the support frame 91 comprises a central body 910, having a substantially cylindrical or otherwise tubular shape, provided with an axial cavity (cylindrical).

To the lower end of the central body 910 is fixed a lid 911 provided with a central hole, the upper end of the central body 910—instead—is open (i.e. it lacks lids).

The upper end of the central body 910 of the electrically assisted steering apparatus 90, 90', defining a substantially flat surface, is directly fixed to the base 20 of the steering column 10 and is in direct contact therewith, i.e. with its flat lower end.

Figure 2:
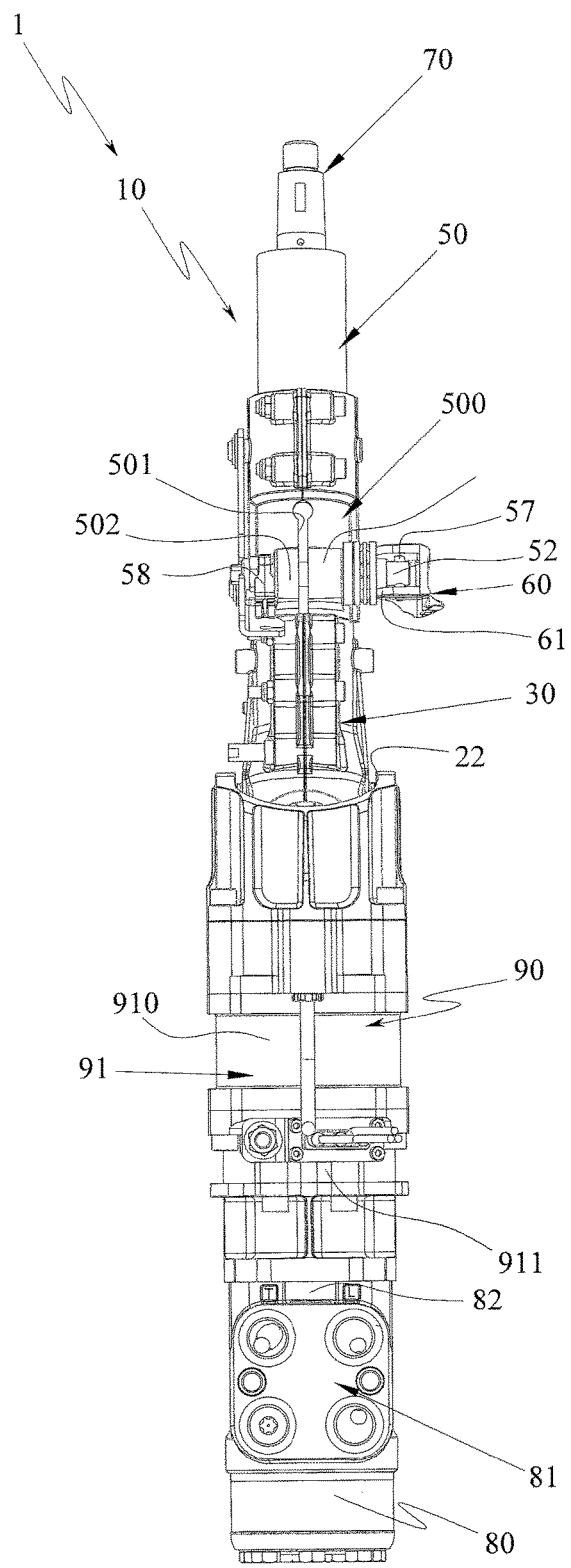
FIG. 2 is a front view (from the rear) of a first embodiment of the electric power steering device of FIG. 1.
Figure 3:
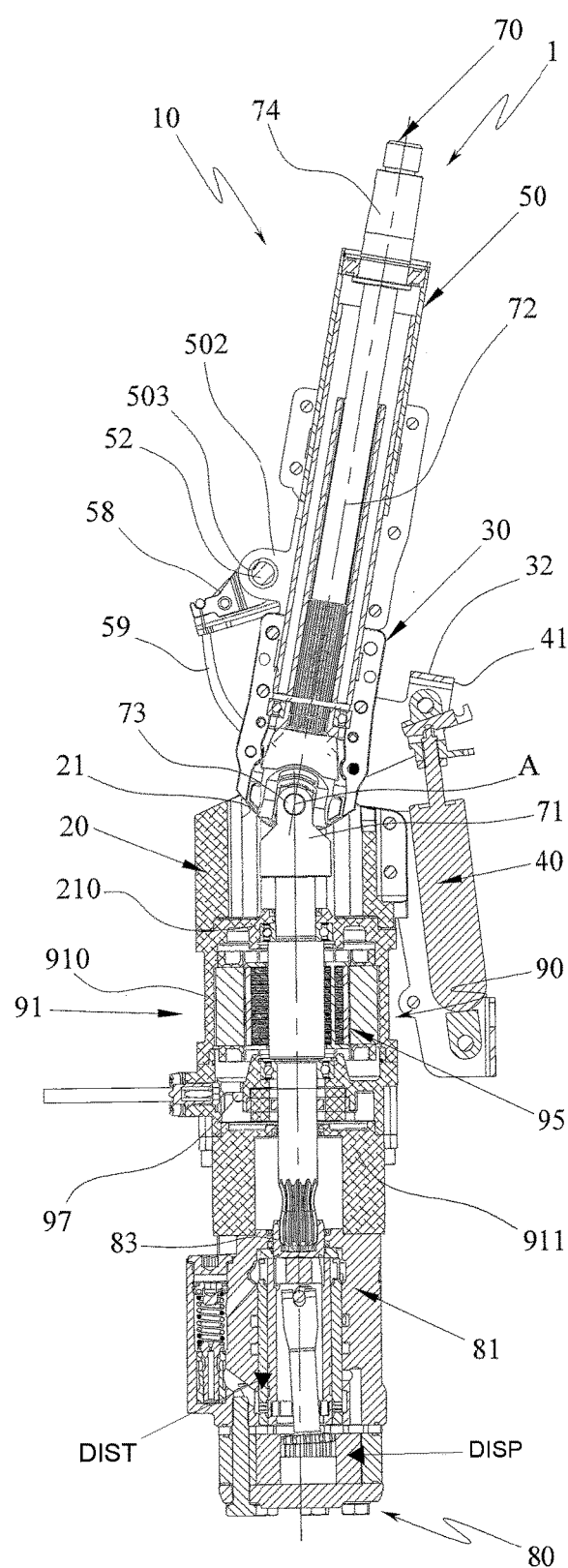
FIG. 3 is a longitudinal section view of the electric power steering device of FIG. 2.
Figure 4:
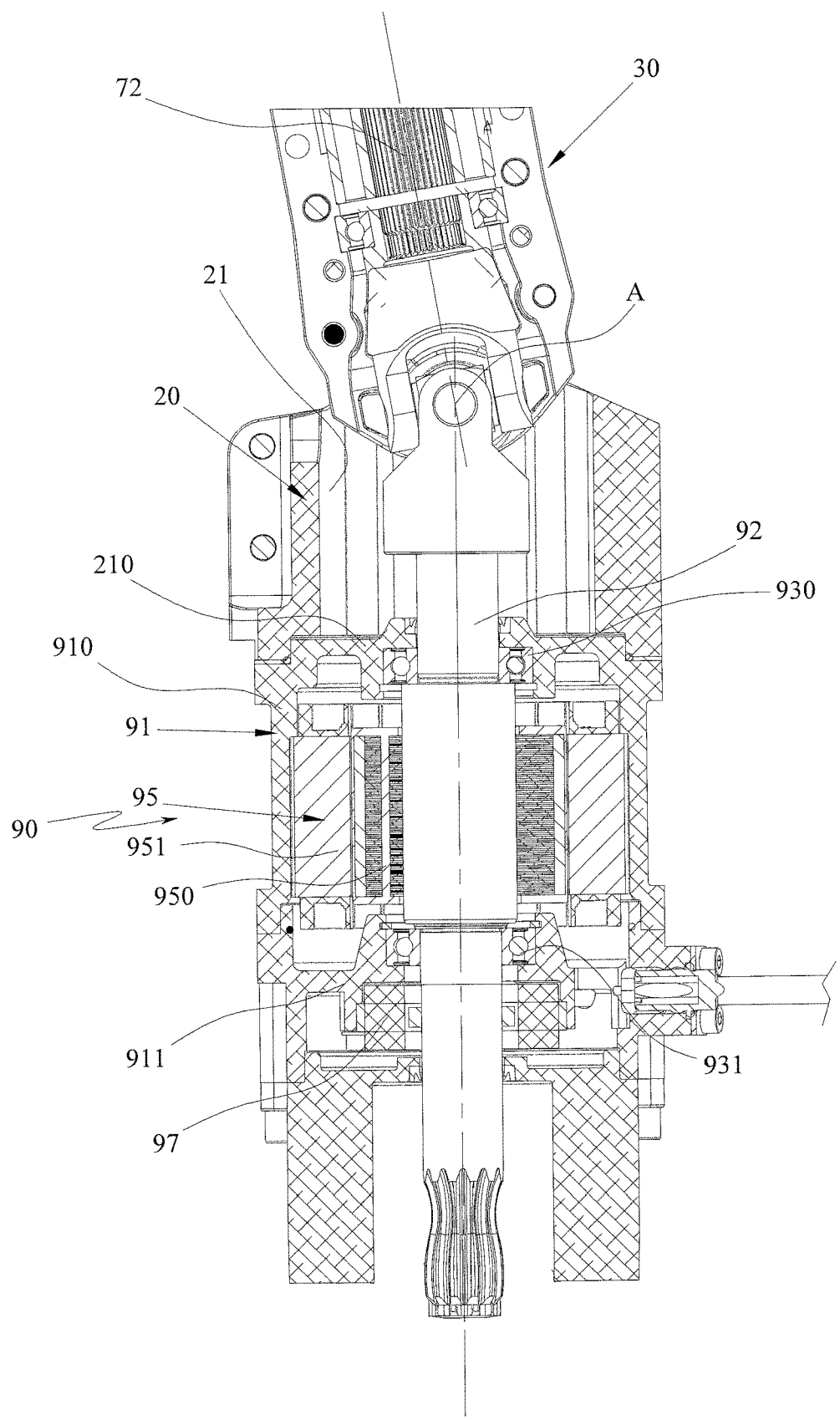
FIG. 4 is a view of a partial detail of FIG. 3.

For example, the upper end of the central body 910 of the electrically assisted steering apparatus 90, 90' is directly fixed to the base 20 by bolting. In a first embodiment of the electrically assisted steering apparatus 90, illustrated in FIGS. 2-4, the electrically assisted steering apparatus 90 comprises a shaft 92 at least partially rotatably housed inside the support frame 91.

The shaft 92 is monolithic.

A upper end of the shaft 92 is positioned coaxially and constrained in rotation to the lower end of the lower axis 71 of the steering column 10.

The upper end of the shaft 92 defines a half-joint with grooved profile, i.e. it has a groove, specifically an outer (male) groove coupled with the inner groove of the lower end of the lower axis 71.

The upper end of the shaft 92 axially projects outside (above) the upper end of the central body 910 and protrudes axially inside the cavity 21 of the base 20.

Similarly, the lower end of the shaft 92 is positioned coaxially and constrained in rotation to the input shaft 83 of the steering unit 81, for example by means of another joint with grooved profile, in which for example the upper end of the input shaft 83 is of the female type and the lower end of the shaft 92 is of the male type.

The shaft 92 is rotatably coupled with the support frame 91, i.e. to the central body 910, through a first bearing 930, which is directly interposed between the shaft and a cylindrical seat obtained in the central body 910 of the support frame 91.

In practice, the first bearing 920 is axially contained in the base 20, inside the cavity 21 thereof.

The shaft 92 is rotatably coupled with the support frame 91, i.e. to the central body 910 also through a second bearing 931 which is directly interposed between the shaft 92 and a cylindrical seat obtained in the lid 911 of the support frame 91 that is connected to the steering unit 80.

The electrically assisted steering apparatus 90 further comprises an electric motor 95, for example a direct current motor (e.g. a brushless motor), which is contained inside the support frame 91, specifically inside the central body 910.

The electric motor 95 comprises an annular rotor 950, to which are directly applied the permanent magnets or the rotor electrical windings of the motor. The annular rotor 950 is directly and coaxially inserted on the shaft 92.

The shaft 92 is constrained in rotation to the annular rotor 950, for example by splicing or by an interference coupling. In any case, the annular rotor 950 of the electric motor 95 is configured to stay in direct contact with the shaft 92, for example throughout the axial extension of the annular rotor itself, so that no gaps remain defined between the annular rotor 950 and the shaft 92. In this way, it is possible to contain the radial size of the annular rotor 950, in which the maximum (outer) diameter can be kept to less than twice the maximum diameter of the shaft 92.

The electrically assisted steering apparatus 90 comprises a position sensor 97 able to sense the angular position of the shaft 92. The position sensor 97 can be positioned inside the support frame 91, for example axially interposed between the second bearing 931 and the lower end of the shaft 92, specifically housed in a seat of the lid 911 (external with respect to the seat housing the third bearing 931). The position sensor 97 can be a resolver having a rotor part integral with the shaft 92 and surrounded by a fixed stator part.

The electric motor 95 and the position sensor 97 can be connected to an electronic control unit 100, which can also be connected to a sensor (represented only schematically in FIG. 1) adapted to measure the steering angle of the wheels.

In general terms, the electronic control unit 100 is configured to receive the measurement signals coming from the aforesaid sensors and to control the operation of the electric motor 95 according to these signals.

More in particular, the electronic control unit 100 can be configured to command the electric motor 95 to apply to the shaft 92 a torque adjusted as a function of the position of the shaft 92 measured by the position sensor 97.

Figure 5:
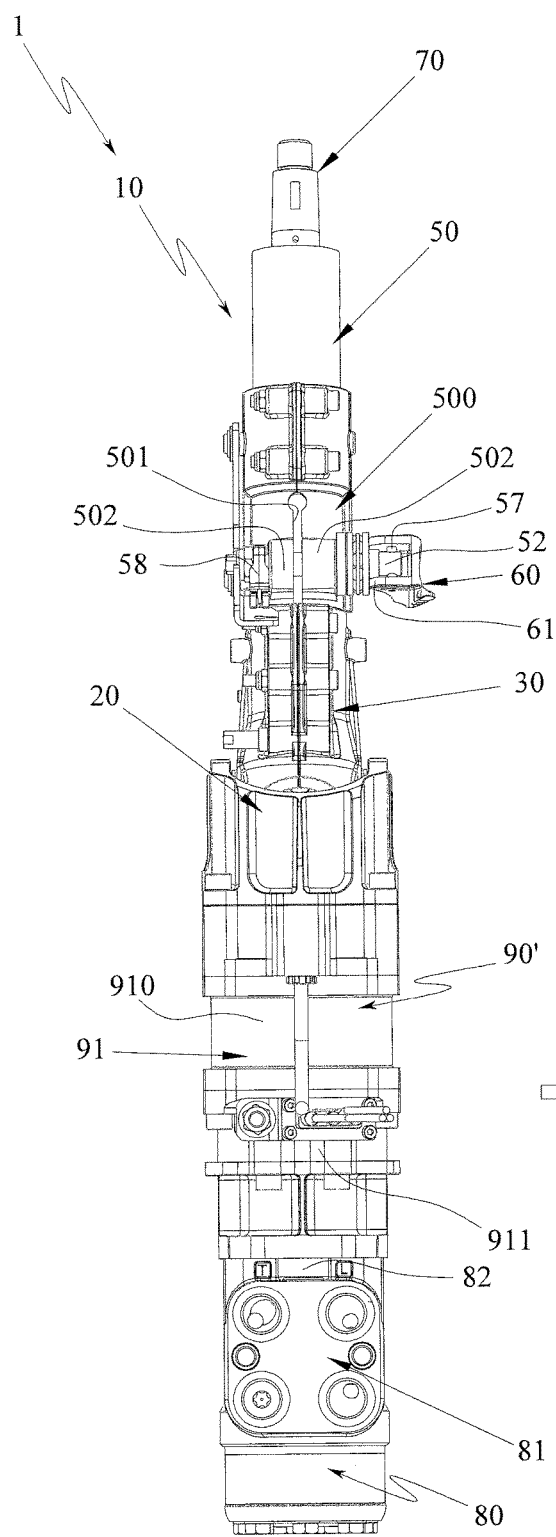
FIG. 5 is a front view (from the rear) of a second embodiment of the electric power steering device of FIG. 1.
Figure 6:
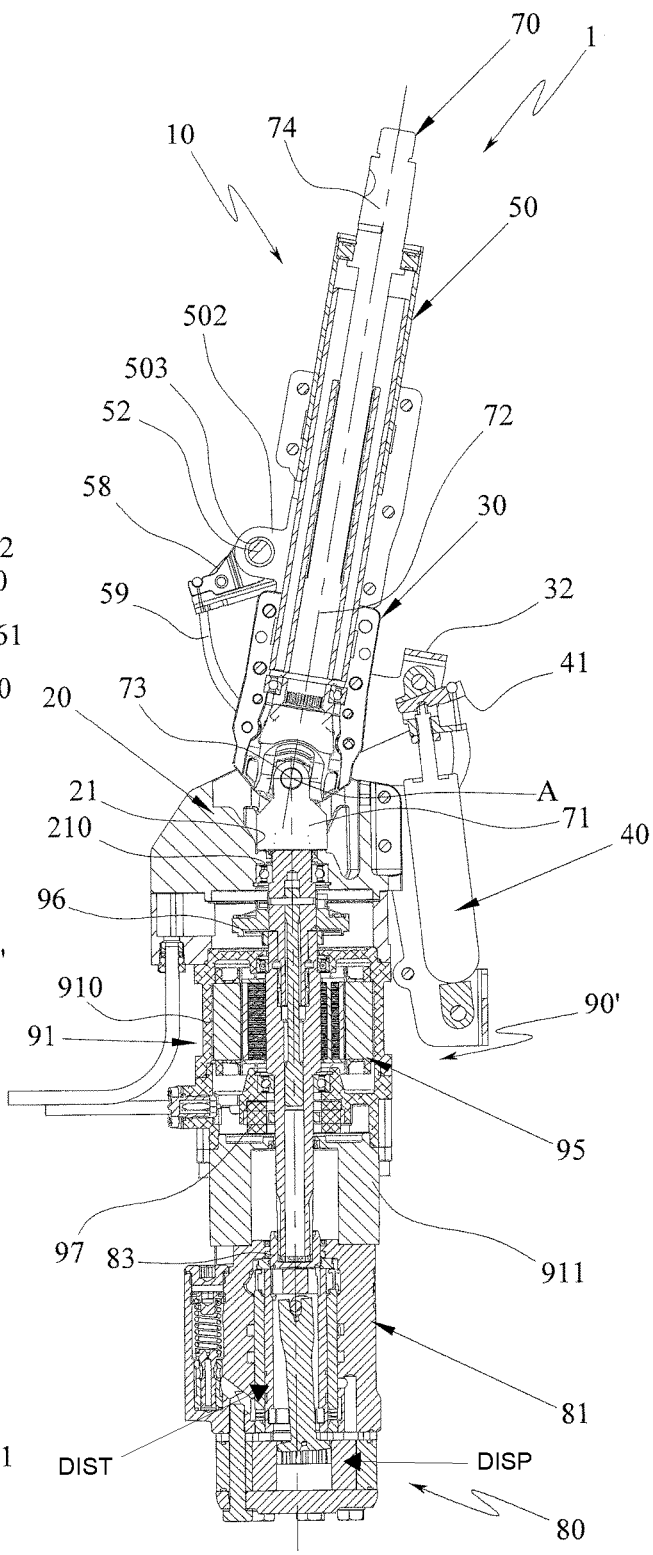
FIG. 6 is a longitudinal section view of the electric power steering device of FIG. 5.
Figure 7:
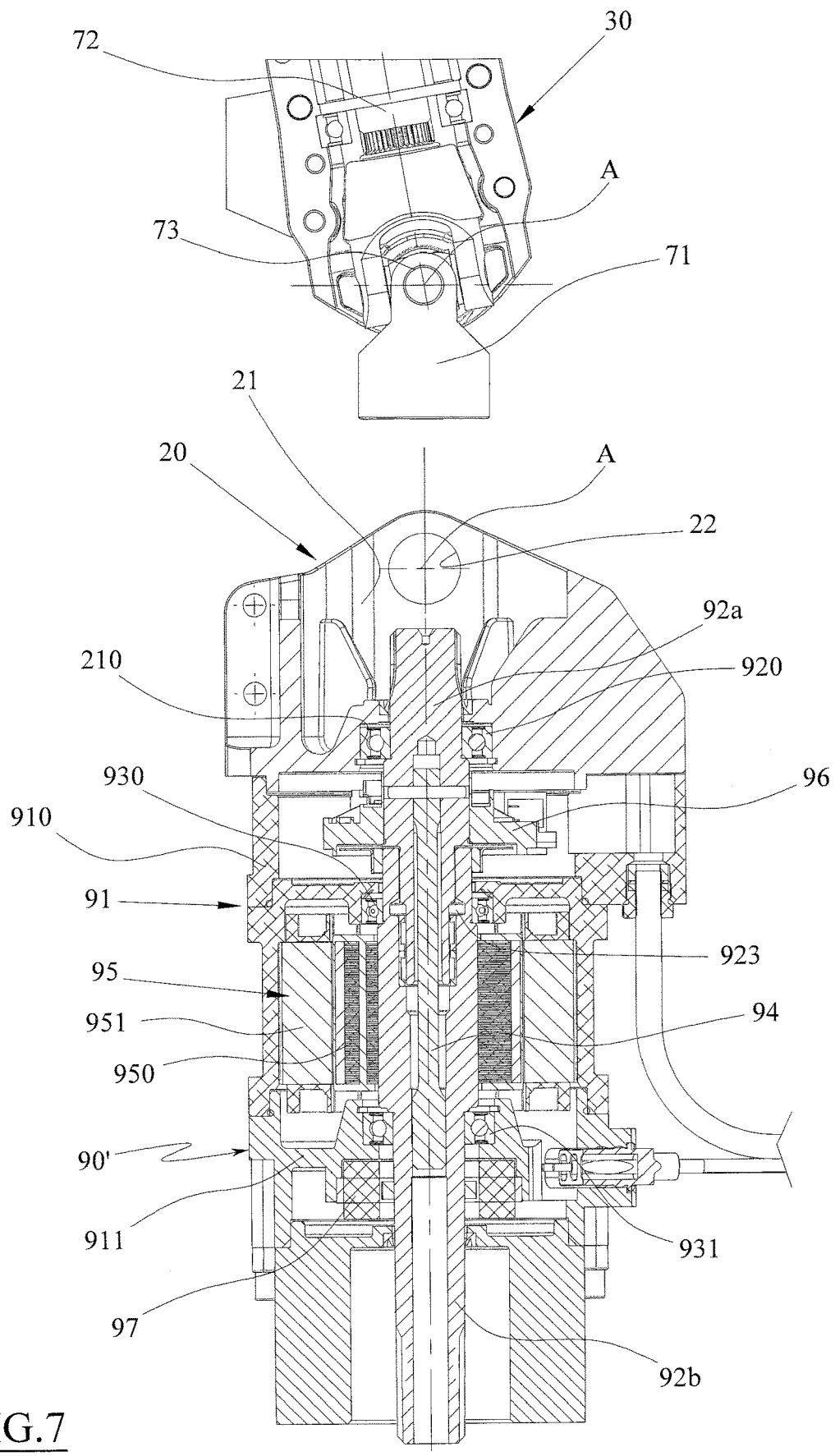
FIG. 7 is a view of an exploded partial detail of FIG. 6.

In a second embodiment of the electrically assisted steering apparatus, illustrated in FIGS. 5-7 and indicated with reference number 90', the shaft 92 comprised a input portion 92a and a output portion 92b which are coaxial and internally hollow.

A lower end of the input portion 92a is coaxially inserted inside an axial cavity of the output portion 92b, effecting a coupling that however does not prevent mutual rotations around the common central axis. On the contrary, between the input portion 92a and the cavity of the output portion 92b can be interposed a bearing 923. The free upper end of the input portion 92a is positioned coaxially and constrained in rotation to the lower end of the lower axis 71 of the steering column 10.

The upper end of the input portion 92a defines a half-joint with grooved profile, i.e. it has a groove, specifically an outer (male) groove coupled with the inner groove of the lower end of the lower axis 71.

The upper end of the input portion 92a axially projects outside (above) the upper end of the central body 910 and protrudes axially inside the cavity 21 of the base 20.

Similarly, the free (lower) end of the output portion 92b is positioned coaxially and constrained in rotation to the input shaft 83 of the steering unit 81, for example by means of another joint with grooved profile, in which for example the upper end of the input shaft 83 is of the female type and the lower end of the output portion 92b is of the male type.

The input portion 92a is rotatably coupled with the support frame 91, i.e. to the central body 910, thanks to the coupling with the output portion 92b and through a first bearing 920, which is directly coupled to the input portion 92a and, in particular, it is directly interposed between the input portion 92a and the first cylindrical seat 210 obtained in the base 20.

In practice, the first bearing 920 is axially contained in the base 20, inside the cavity 21 thereof.

The output portion 92b is rotatably coupled to the support frame 91, i.e. to the central body 910, through a pair of bearings, of which a second bearing 930, which is directly coupled to the portion of the output portion 92b into which the input portion 92a is inserted, and a third bearing 931, which is axially distanced from the second bearing 930 and is directly coupled to the output portion 92b in a closer position to the free end. In particular, the second bearing 930 is directly interposed between the output portion 92b and a cylindrical seat obtained in the central body 910 of the support frame 91, while the second bearing 931 is directly interposed between the output portion 92b and a cylindrical seat obtained in the lid 911 of the support frame 91 that is connected to the steering unit 80.

The input portion 92a and the output portion 92b are mutually constrained in rotation by a torsion bar 94, coaxial thereto, which is partially housed in the axial cavity of the input portion 92a and, for the remaining part, in the inner cavity of the output portion 92b, so as to be fully enclosed therein.

The axial cavity of the output portion 92a is a through cavity that extends throughout the length of the output shaft. A first (upper) end of the torsion bar 94 is located inside the axial cavity of the input portion 92a, where it is axially positioned in the space between the first bearing 920 and the second bearing 930, and where it is constrained, by means of a fastening pin, so as to be integral in rotation with the input portion 92a.

The axial cavity of the output portion 92b is a blind cavity that extends axially, starting from the end into which the input portion 92a is inserted, to a segment positioned substantially at the third bearing 931. A second (lower) end of the torsion bar 94 is substantially positioned inside the axial cavity of the output portion 92b, where it is axially positioned in the space between the third bearing 931 and the free end of the output portion 92b and where it is constrained so as to be integral in rotation with the output shaft itself. For example, the second end of the torsion bar 94 can have a prismatic shape which is coupled with a corresponding prismatic portion of the axial cavity of the output portion 92b.

In this way, the torsion bar 94 is sufficiently long to allow minimal mutual rotations between the input portion 92a and the output portion 92b, while maintaining the overall axial size of the electrically assisted steering apparatus 90' rather small.

The electrically assisted steering apparatus 90' further comprises an electric motor 95, for example a direct current motor (e.g. a brushless motor), which is contained inside the support frame 91, specifically inside the central body 910.

The electric motor 95 comprises an annular rotor 950, to which are directly applied the permanent magnets or the rotor electrical windings of the motor. The annular rotor 950 is directly and coaxially inserted on the output portion 92b, positioned so that the entire axial size of the annular rotor 950 is fully contained in the space between the second bearing 930 and the third bearing 931.

The output portion 92b is constrained in rotation to the annular rotor 950, for example by splicing or by an interference coupling. In any case, the annular rotor 950 of the electric motor 95 is configured to stay in direct contact with the output portion 92b, for example throughout the axial extension of the annular rotor itself, so that no gaps remain defined between the annular rotor 950 and the output portion 92b. In this way, it is possible contain the radial size of the annular rotor 950, in which the maximum (outer) diameter can be kept to less than twice the maximum diameter of the output portion 92b.

The electric motor 95 further comprises an annular stator 951, to which the electric stator windings of the motor are directly applied. The annular stator 951 coaxially surrounds the annular rotor 950 and it is fastened inside the support frame 91 of the electrically assisted steering apparatus 90'.

The electrically assisted steering apparatus 90' can also comprise a torque sensor 96 adapted to measure the torque applied to the input portion 92a. The torque sensor 96 can be positioned inside the support frame 91, in the space between the first bearing 920 and the second bearing 930. In practice, the torque sensor 96 comprises means adapted to stay in direct contact with the input portion 92a and with the output portion 92b, so as to sense the small mutual rotations allowed by the torsion bar 94. In this way, knowing the mutual displacement of the portions 92a and 92b of the shaft 92 and the elastic characteristic of the torsion bar 94 it is possible to determine the torque applied to the input portion 92a.

The electrically assisted steering apparatus 90' also comprises a position sensor 97 able to sense the angular position of the output portion 92b. The position sensor 97 can be positioned inside the support frame 91, for example axially interposed between the third bearing 931 and the free (lower) end of the output portion 92b, specifically housed in a seat of the lid 911 (external with respect to the seat housing the third bearing 931). The position sensor 97 can be a resolver having a rotor part integral with the output portion 92b and surrounded by a fixed stator part.

The electric motor 95, the torque sensor 96 and the position sensor 97 can be connected to an electronic control unit 100, which can also be connected to a sensor (represented only schematically in FIG. 1) adapted to measure the steering angle of the wheels.

In general terms, the electronic control unit 100 is configured to receive the measurement signals coming from the aforesaid sensors and to control the operation of the electric motor 95 according to these signals.

More in particular, the electronic control unit 100 can be configured to command the electric motor 95 to apply to the output portion 92b a torque adjusted as a function of the torque measured by the torque sensor 96. In this way depending on the programme that is executed by the electronic control unit 100, it is possible to allow the driver to steer the wheels effortlessly, or it is possible to adjust the effort required from the driver according to driving conditions or to other factors.

For example, the electronic control unit 100 can be configured to change the value of the torque provided by the electric motor 95 according to the forward speed of the vehicle, for example causing resistance to the input portion 92a (and hence to the steering wheel) to increase as speed increases, or causing resistance to shift from a lower resistance level to a higher resistance level upon exceeding a speed of the vehicle above a determined set reference value.

The invention thus conceived is susceptible to many modifications and variants, all falling within the same inventive concept.

Furthermore, all details may be replaced by technically equivalent elements.

In practice, the materials used, as well as their shapes and dimensions, can be of any type according to the technical requirements without thereby departing from the scope of protection of the following claims.

The invention claimed is:

1. An electric power steering device (1) comprising:
a steering column (10) provided with:
a base (20);
an upper segment (50) connected to the base (20), in which the upper segment (50) is connected in a tiltable manner with respect to the base (20);
a steering axis (70) comprising a lower axis (71) rotatably contained inside the base (20);
a hydrostatic steering assembly (80);
an electrically assisted steering apparatus (90,90') axially interposed between the steering column (10) and the hydrostatic steering assembly (80) the electrically assisted steering apparatus (90, 90') comprises:
a support frame (91) comprising a tubular central body (910);
a shaft (92) whose upper end axially projects outside an upper end of the central body (910) and is connected to a lower end of the lower axis (71), and whose lower end is connected to the hydrostatic steering assembly (80);
an electric motor (95) comprising an annular rotor (950) constrained in rotation to the shaft (92) and an annular stator (951) that coaxially surrounds the annular rotor (950) and is fixed inside the central body (910) of the support frame (91);
wherein the upper end of the central body (910) of the support frame (91) of the electric steering apparatus (90,90') is directly fixed to the base (20) of the steering column (10) and in contact therewith.

2. The electric power steering device (1) according to claim 1, wherein the lower end of the lower axis (71) is axially contained inside the base (20), the upper end of the shaft (92) protruding axially inside the base (20) of the steering column (10).

3. The electric power steering device (1) according to claim 1, wherein the lower end of the lower axis (71) is constrained in rotation to the upper end of the shaft (92) by a joint with grooved profile, wherein the lower end of the lower axis (71) is of the female type and the upper end of the shaft (92) is of the male type.

4. The electric power steering device (1) according to claim 1, wherein the base (20) comprises a second cylindrical seat (22) with orthogonal axis with respect to the lower axis adapted to support a hinge pin (31) for the tilting of the upper segment (50) with respect to the base (20).

5. The electric power steering device (1) according to claim 1, wherein between the base (20) and the upper segment (50) of the steering column (10) an intermediate segment (30) is interposed, the upper segment (50) being slidably connected to the intermediate segment (30).

6. The electric power steering device (1) according to claim 1, wherein the steering column (10) comprises an actuation lever (60) connected to the upper segment (50) and able to be operated to unblock and/or block the mutual tilting between the base (20) and the upper segment (50).

7. The electric power steering device (1) according to claim 1, wherein the hydrostatic steering assembly (80) comprises a distributor (DIST) and a dispenser (DISP).

8. The electric power steering device (1) according to claim 1, wherein the hydrostatic steering assembly (80) comprises an outer body (82) fixed to a lower end of the central body (910) of the support frame (91).

9. The electric power steering device (1) according to claim 1, wherein the shaft (92) comprises a input portion (92a), whose upper end axially projects outside an upper end of the central body (910) and is connected to a lower end of the lower axis (71), and an output portion whose lower end is connected to the hydrostatic steering assembly (80) and wherein the electrically assisted steering (90') comprises a torsion (94) bar having a first end constrained in rotation to the input portion (92a) of the shaft (92) and a second end constrained in rotation to the output portion (92b) of the shaft (92).

10. The electric power steering device (1) according to claim 9, wherein the input portion (92a) of the shaft (92) is rotatably coupled to the support frame (91) through a first bearing (920) directly interposed between the input portion (92a) and a first cylindrical seat (210) obtained in the base (20) of the steering column (10).

\* \* \* \* \*